United States Patent [19]
Kodaira

[11] Patent Number: 5,825,473
[45] Date of Patent: Oct. 20, 1998

[54] DISTANCE MEASURING DEVICE HAVING PROTECTIVE COVER WITH SELECTIVE LIGHT PROPAGATION PREVENTION

[75] Inventor: Takanori Kodaira, Kanagawa-ken, Japan

[73] Assignee: Canon Kabushiki Kaisha, Tokyo, Japan

[21] Appl. No.: 525,290

[22] Filed: Sep. 8, 1995

[30] Foreign Application Priority Data

Sep. 16, 1994 [JP] Japan .................................. 6-246722

[51] Int. Cl.$^6$ ...................................................... G01C 3/04
[52] U.S. Cl. ............................................................ 356/3.04
[58] Field of Search .......................... 382/106; 348/135; 359/601, 609, 614; 354/403; 250/201.6, 237 R; 356/3.01, 3.02, 3.03, 3.04

[56] References Cited

U.S. PATENT DOCUMENTS

| 4,375,332 | 3/1983 | Yokota et al. ............................... 356/1 |
| 4,710,011 | 12/1987 | Ushiro ....................................... 354/403 |
| 5,087,935 | 2/1992 | Kaneda et al. ........................... 354/403 |
| 5,488,468 | 1/1996 | Kawanishi et al. ..................... 356/3.02 |

Primary Examiner—Frank G. Font
Assistant Examiner—Zandra V. Smith
Attorney, Agent, or Firm—Robin, Blecker & Daley

[57] ABSTRACT

A distance measuring device for measuring a distance by receiving, at a light receiving system, a reflected light caused by a light projected from a light projecting system is provided with a protection cover provided on front sides of the light projecting system and the light receiving system and a preventive arrangement for preventing the light projected from the light projecting system from propagating through the protection cover to enter the light receiving system.

36 Claims, 4 Drawing Sheets

DISTANCE MEASURING DEVICE HAVING PROTECTIVE COVER WITH SELECTIVE LIGHT PROPAGATION PREVENTION

BACKGROUND OF THE INVENTION

1. Field of the Invention

This invention relates to an improvement on a distance measuring device for measuring a distance to an object by projecting a light onto the object and receiving a reflected, light coming from the object as a result of the projection of the light.

2. Description of the Related Art

A protective construction in which the front side of a distance measuring device composed of a light projecting element which projects a spot light onto an object and a light receiving element which receives a reflected light coming from the object is covered with a protection cover having an integral structure has been known from a disclosure made in Japanese Utility Model Publication No. HEI 4-42824.

FIG. 7 shows the structural arrangement of the conventional protection cover of the distance measuring device. Referring to FIG. 7, a light projecting part and a light receiving part are arranged in parallel within a frame body 5 across a partition. The light projecting part includes a light projecting element 1 which projects an infrared light and a light projecting lens 2 which is disposed in front of the light projecting element 1. The light receiving part includes a light receiving lens 4 which condenses the infrared light reflected by a distance-measured object and a light receiving element 3 which receives the condensed reflected light. The front sides of the light projecting lens 2 and the light receiving lens 4 are covered with a protection cover 6 having an integral structure and disposed at the front end of the frame body 5.

It is a recent trend to reduce the sizes of cameras. The size of the distance measuring device to be mounted on a camera is also being reduced. The reduction in size of the distance measuring device results in a narrower space between the light projecting part and the light receiving part. Then, the arrangement of covering the front side of the distance measuring device with the protection cover having an integral structure degrades the accuracy of distance measurement, because a portion L1' of a spot light L1 projected from the light projecting element 1 is reflected by the inside of the protection cover 6 and comes to the light receiving element 3. The light portion L1' propagates through the inside of the protection cover 6, as shown in FIG. 7, and enters the light receiving element 3 as a noise in addition to a reflected light L2 of the spot light coming from the object. This noise presents a problem as it lowers the accuracy of distance measurement.

SUMMARY OF THE INVENTION

In accordance with one aspect of this invention, there is provided a distance measuring device for measuring a distance by receiving, at a light receiving system, a reflected light caused by a light projected from a light projecting system, comprising a protection cover provided on front sides of the light projecting system and the light receiving system, and prevention means for preventing the light projected from the light projecting system from propagating through the protection cover to enter the light receiving system, so that the accuracy of distance measurement can be prevented from degrading.

The above and other aspects and features of this invention will become apparent from the following detailed description of embodiments thereof taken in connection with the accompanying drawings.

DETAILED DESCRIPTION OF THE PREFERRED EMBODIMENTS

Figure 1:
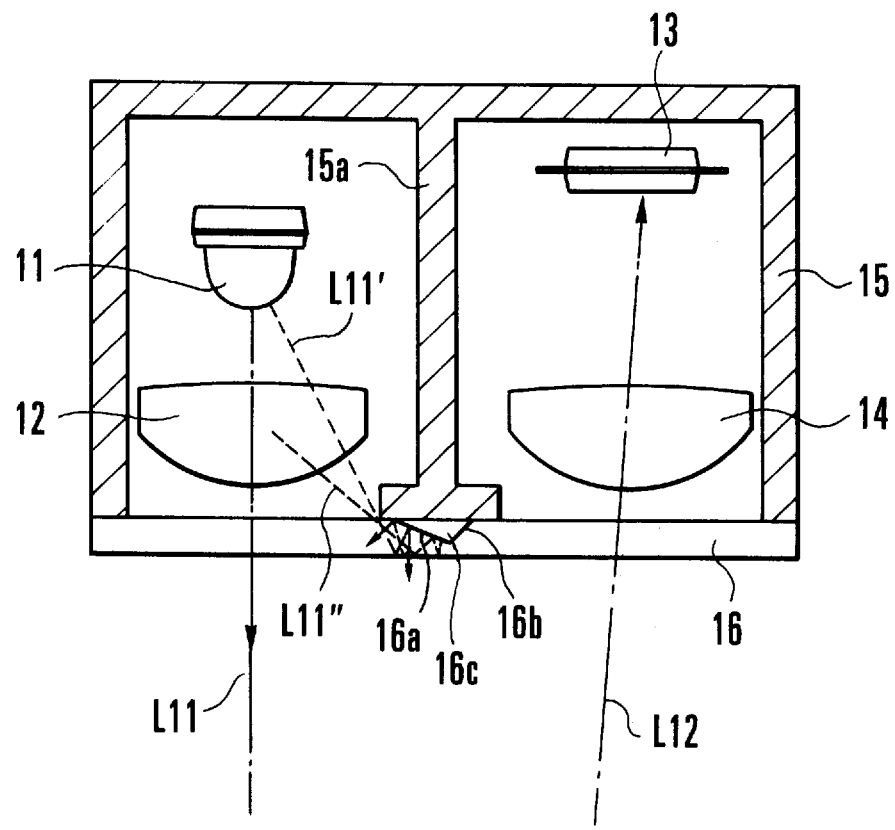
FIG. 1 is a transverse sectional view showing a distance measuring device to which this invention is applied as a first embodiment thereof.
Figure 2:
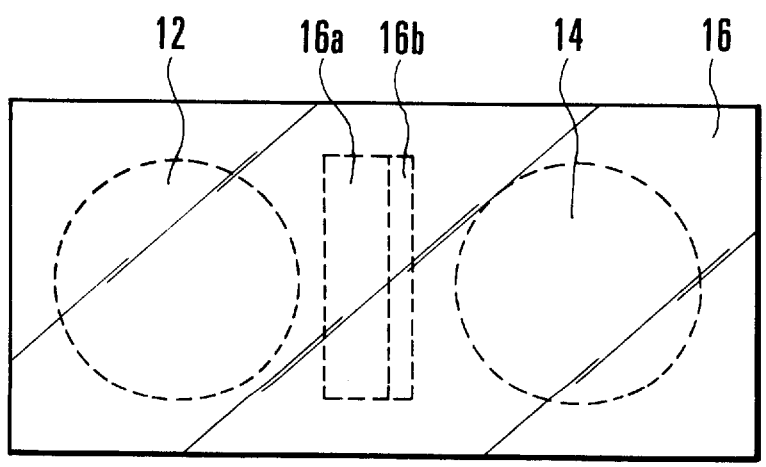
FIG. 2 is a front view showing the distance measuring device of FIG. 1.

A first embodiment of this invention is first described with reference to FIGS. 1 and 2. FIG. 1 is a transverse sectional view of a distance measuring device which is the first embodiment of this invention. FIG. 2 is a front view of the same distance measuring device.

Referring to FIGS. 1 and 2, a light projecting element 11 is arranged to project an infrared light. A light projecting lens 12 is arranged to condense the infrared light projected by the light projecting element 11. The light projecting element 11 and the light projecting lens 12 jointly form a light projecting part which is arranged to project an infrared spot light L11 toward a distance-measured object. A light receiving element 13 and a light receiving lens 14 which is arranged in front of the light receiving element 13 to condense light jointly form a light receiving part. The light receiving part is arranged to receive a reflected light L12 caused by the infrared spot light projected onto the object. The distance measuring device is thus arranged to compute a distance to the distance-measured object.

A frame body 15 holds therein the light projecting part and the light receiving part, with a partition 15a arranged to separate these parts from each other. A protection cover 16 is made of a material capable of transmitting infrared rays and is securely fixed to the front end of the frame body 15 in such a way as to integrally cover the front sides of the light projecting lens 12 and the light receiving lens 14. On the back surface of the protection cover 16, a recessed part 16c is formed at an intermediate part between the light projecting part and the light receiving part. The recessed part 16c is composed of oblique faces 16a and 16b.

With the embodiment arranged in this manner, almost all portions of the infrared light projected by the light projecting element 11 are directed toward the distance-measured object in the form of a spot light L11. However, some portions L11' and L11" of the infrared light fall on the protection cover 16 at certain angles and thus come to propagate toward the light receiving lens 14 through the inside of the protection cover 11, in a state of being repeatedly reflected between the front and back surfaces of the protection cover 16. However, since there is provided the recessed part 16c in the intermediate part of the protection cover 16 between the light projecting part and the light receiving part, the propagating portions of light L11' and L11" repeat reflecting between the oblique face 16a of the recessed part 16c and the front surface of the protection cover 16. The recessed part 16c thus acts to cause the light portion L11' to change its direction and the light portion L11" to attenuate by increasing the number of times of its reflection. Hence, no light that would act as a noise is allowed to propagate into the light receiving part.

Figure 3:
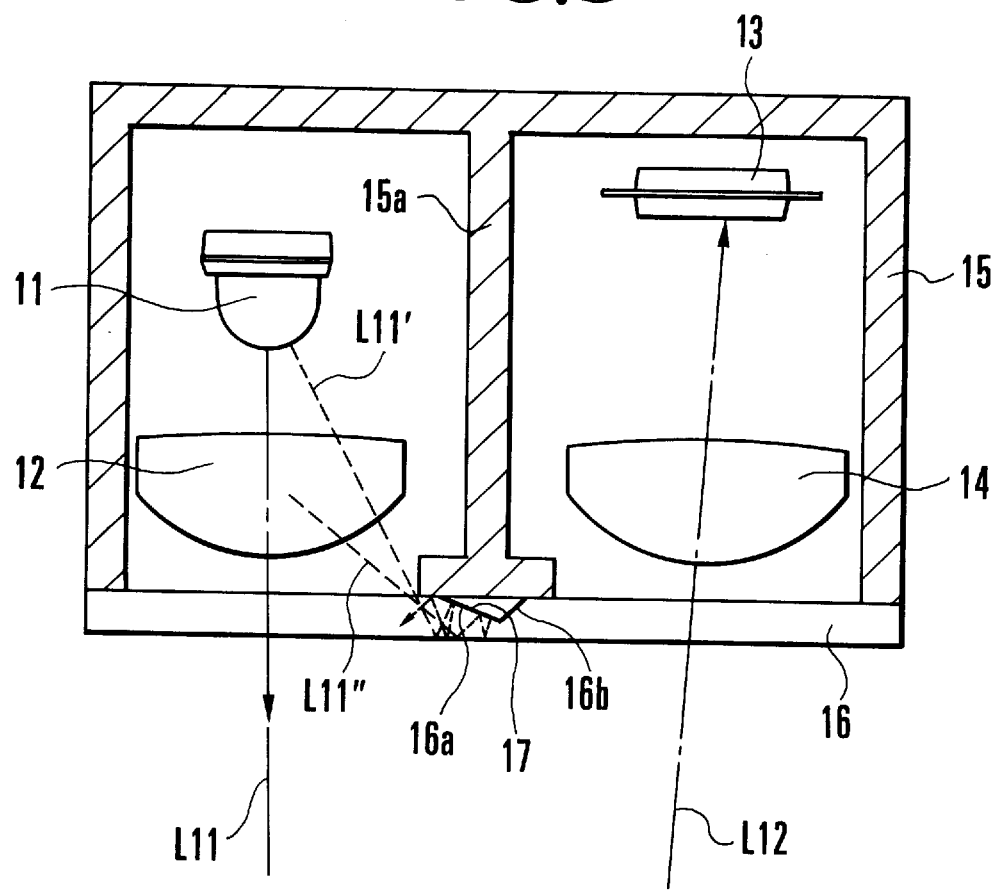
FIG. 3 is a transverse sectional view showing a distance measuring device to which this invention is applied as a second embodiment thereof.
Figure 4:
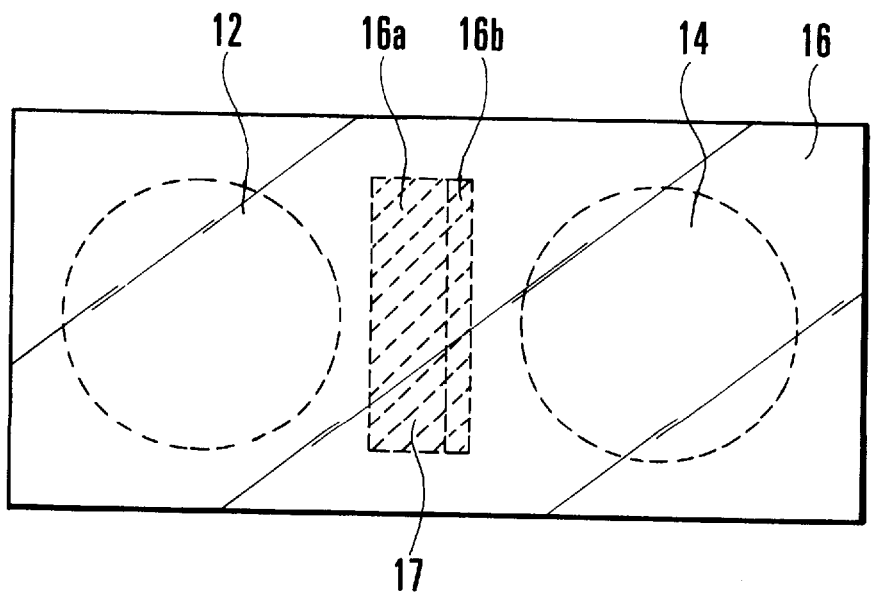
FIG. 4 is a front view showing the distance measuring device of FIG. 3.

FIGS. 3 and 4 show a second embodiment of this invention. For the sake of simplification, the same parts as those of the first embodiment are indicated by the same reference numerals and the following description is limited to a point where the second embodiment differs from the first embodiment. In the case of the second embodiment, an infrared ray absorbing paint 17 is applied to the oblique faces 16a and 16b of the recessed part 16c which is provided in the protection cover 16. With the exception of this point, all other parts of the arrangement are identical with the first embodiment which has been described in the foregoing.

With the second embodiment arranged in this manner, the infrared light portions L11' and L11" which propagate from the light projecting part while being reflected by the inside of the protection cover 16 are absorbed by the infrared ray absorbing paint 17 every time they repeatedly reflect between the oblique face 16a and the front surface of the protection cover 16. Compared with the arrangement of the first embodiment, therefore, the propagating light portions L11' and L11" can be more effectively attenuated.

Figure 5:
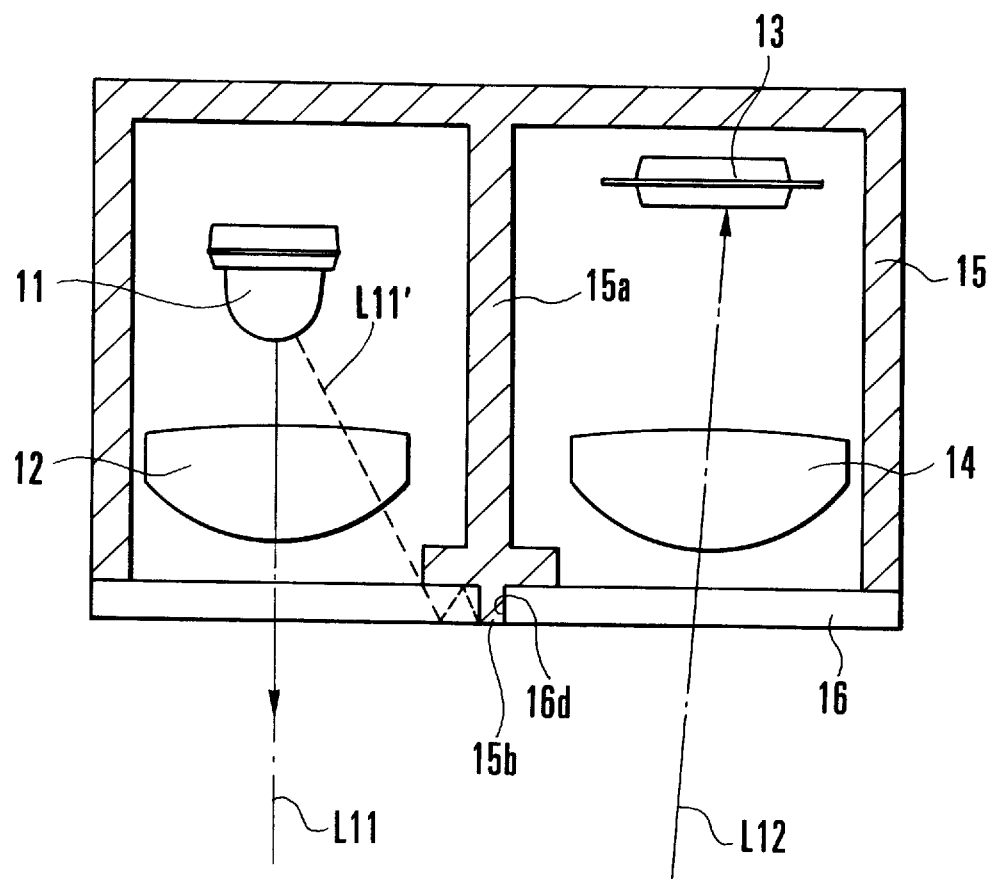
FIG. 5 is a transverse sectional view showing a distance measuring device to which this invention is applied as a third embodiment thereof.
Figure 6:
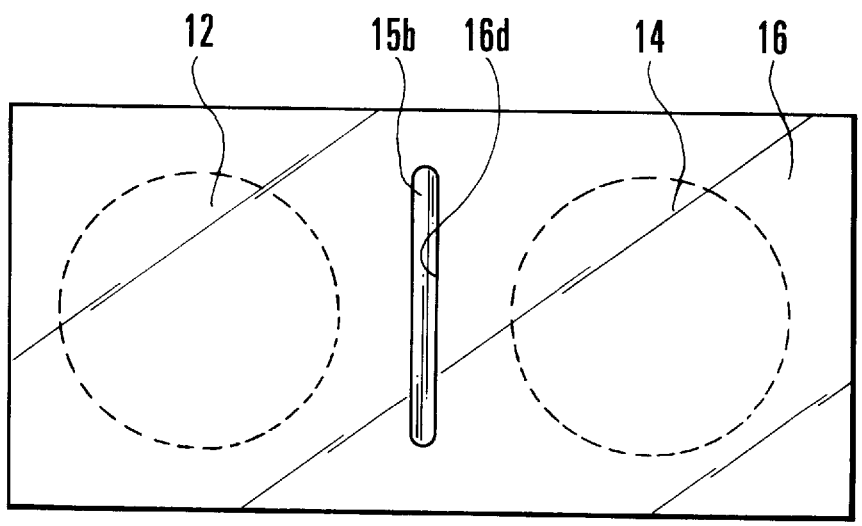
FIG. 6 is a front view showing the distance measuring device of FIG. 5.
Figure 7:
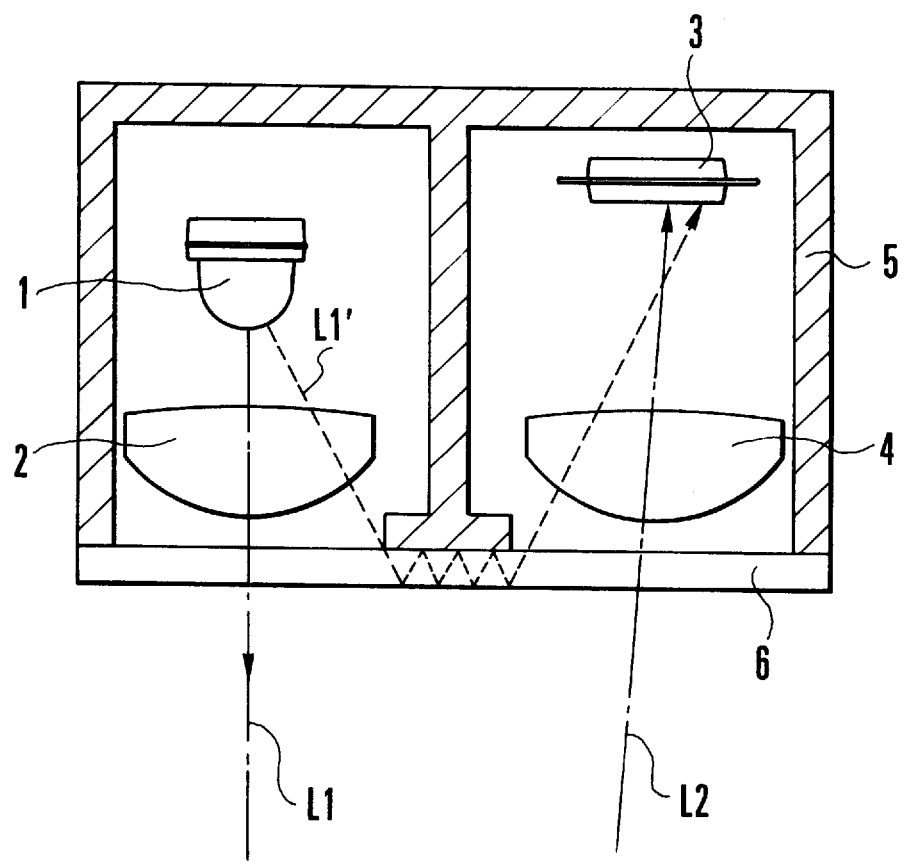
FIG. 7 is a transverse sectional view showing by way of example the conventional distance measuring device.

FIGS. 5 and 6 show a third embodiment of this invention. The third embodiment differs from the first embodiment in that the recessed part 16c of the protection cover 16 is replaced with a slot 16d which is formed, in the same longer diameter as the diameters of the light projecting and receiving lenses 12 and 14, in the protection cover 16 and at its intermediate part which is opposed to the fore end of the partition 15a between the light projecting part and the light receiving part. Further, a projection 15b which has a light blocking property and is of the same shape as the slot 16d is provided at the fore end of the partition 15a in a state of being fitted in the slot 16d. With the exception of this point, all other parts are arranged in the same manner as the first embodiment.

With the third embodiment arranged in this manner, although the portion L11' of the infrared light projected from the light projecting element 11 propagates inside of the protection cover 16 while being reflected, the propagation is blocked by the projection 15b at the fore end of the partition 15a and is thus never allowed to come into the light receiving part.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

In accordance with this invention, the technological elements disclosed in the foregoing may be combined with each other as desired.

Further, in accordance with this invention, the whole or a part of the claims or the arrangement of each embodiment described may be arranged as an integral whole of a device or to be combined with some other device, or to be a component of an apparatus.

Further this invention is applicable to a single-lens reflex camera, a lens-shutter time camera, a video camera, cameras of other kinds, optical apparatuses or apparatuses other than cameras and component elements constituting them.

What is claimed is:

1. A distance measuring device for measuring a distance by receiving, at a light receiving system, a reflected light caused by a light projected from a light projecting system, comprising:

a) a light-transmissive protection cover which overlies front sides of both the light projecting system and the light receiving system; and b) a prevention portion disposed at said protection cover for preventing the light projected from the light projecting system into said protection cover from propagating through said protection cover to enter the light receiving system.

2. A device according to claim 1, wherein said protection cover integrally covers the front sides of the light projection system and the light receiving system.

3. A device according to claim 1, wherein said prevention portion is disposed within said protection cover.

4. A device according to claim 1, wherein said prevention portion includes a cutout provided in said protection cover.

5. A device according to claim 4, wherein said prevention portion includes a light absorbing member provided at said cutout.

6. A device according to claim 1, wherein said prevention portion includes a light absorbing member.

7. A device according to claim 1, wherein said prevention portion includes a light attenuating member.

8. A device according to claim 1, wherein said prevention portion includes a recessed part provided at said protection cover and formed aslant in a propagating direction of the light.

9. A device according to claim 1, wherein said prevention portion includes a light blocking member inserted into said protection cover.

10. A distance measuring device for measuring a distance by receiving, at a light receiving system, a reflected light caused by a light projected from said device, comprising:

a) a light projecting system providing said light projected from said device;

b) a light-transmissive protection cover which overlies front sides of both the light projecting system and the light receiving system; and b) a prevention portion means disposed at said protection cover for preventing the light projected from the light projecting system into said protection cover from propagating through said protection cover to enter the light receiving system.

11. A device according to claim 10, wherein said light projecting system includes a light projecting element and a light projecting lens.

12. A distance measuring device for measuring a distance, comprising:

a) a light projecting system for projecting a light from said device;

b) a light receiving system for receiving a reflected light caused by the light projected from said light projecting system;

c) a light-transmissive protection cover which overlies front sides of both the light projecting system and the light receiving system; and d) a prevention portion disposed at said protection cover for preventing the light projected from the light projecting system into said protection cover from propagating through said protection cover to enter the light receiving system.

13. A distance measuring device for measuring a distance by receiving a reflected light caused by a light projected from a light projecting system, comprising:

a) a light receiving system for receiving a reflected light caused by the light projected from said light projecting system;

b) a light-transmissive protection cover overlying front sides of both the light projecting system and the light receiving system; and c) prevention means disposed at said protection cover for preventing the light projected from the light projecting system into said protection cover from propagating through said protection cover to enter the light receiving system.

14. A device according to claim 13, wherein said light receiving system includes a light receiving element and a light receiving lens.

15. A light-transmissive protection cover adapted to a distance measuring device for measuring a distance by receiving, at a light receiving system, a reflected light caused by a light projected from a light projecting system, said protection cover overlying both said light receiving system and said light projecting system and having a prevention portion for preventing the light projected from said light projecting system into said protection cover from propagating through said protection cover to enter the light receiving system.

16. A protection cover according to claim 15, wherein said protection cover integrally covers front sides of the light projecting system and the light receiving system.

17. A protection cover according to claim 15, wherein said prevention portion includes a cutout provided in said protection cover.

18. A protection cover according to claim 17, wherein said prevention portion includes a light absorbing member provided at said cutout.

19. A protection cover according to claim 15, wherein said prevention portion includes a light absorbing member.

20. A protection cover according to claim 15, wherein said prevention portion includes a light attenuating member.

21. A protection cover according to claim 15, wherein said prevention portion includes a recessed part formed aslant in a propagating direction of the light.

22. A protection cover according to claim 15, wherein said prevention portion includes a light blocking member inserted into said protection cover.

23. A camera having a distance measuring device for measuring a distance by receiving, at a light receiving system, a reflected light caused by a light projected from a light projecting system, comprising:

a) a light-transmissive protection cover which overlies front sides of both the light projecting system and the light receiving system; and b) a prevention portion disposed at said protection cover for preventing the light projected from the light projecting system into said protection cover from propagating through said protection cover to enter the light receiving system.

24. A camera according to claim 23, wherein said protection cover integrally covers the front sides of the light projection system and the light receiving system.

25. A camera according to claim 23, wherein said prevention portion is disposed within said protection cover.

26. A camera according to claim 23, wherein said prevention portion includes a cutout provided in said protection cover.

27. A camera according to claim 26, wherein said prevention portion includes a light absorbing member.

28. A camera according to claim 23, wherein said prevention portion includes a light absorbing member.

29. A camera according to claim 23, wherein said prevention portion includes a light attenuating member.

30. A camera according to claim 23, wherein said prevention portion includes a recessed part provided at said protection cover and formed aslant in a propagating direction of the light.

31. A camera according to claim 23, wherein said prevention portion includes a light blocking member inserted into said protection cover.

32. A camera having a distance measuring device for measuring a distance by receiving, at a light receiving system, a reflected light caused by a light projected from said device, comprising:

a) a light projecting system providing said light projected from said device;

b) a light-transmissive protection cover which overlies front sides of both the light projecting system and the light receiving system; and c) a prevention portion disposed at said protection cover for preventing the light projected from the light projecting system into said protection cover from propagating through said protection cover to enter the light receiving system.

33. A camera according to claim 32, wherein said light projecting system includes a light projecting element and a light projecting lens.

34. A camera having a distance measuring device for measuring a distance, comprising:

a) a light projecting system for projecting a light from said device;

b) a light receiving system for receiving a reflected light caused by the light projected from said light projecting system;

c) a light-transmissive protection cover which overlies front sides of both the light projecting system and the light receiving system; and d) a prevention portion disposed at said protection cover for preventing the light projected from the light projecting system into said protection cover from propagating through said protection cover to enter the light receiving system.

35. A camera having a distance measuring device for measuring a distance by receiving a reflected light caused by a light projected from a light projecting system, comprising:

a) a light receiving system for receiving a reflected light caused by the light projected from said light projecting system;

b) a light-transmissive protection cover which overlies front sides of both the light projecting system and the light receiving system; and c) a prevention portion disposed at said protection cover for preventing the light projected from the light projecting system into said protection cover from propagating through said protection cover to enter the light receiving system.

36. A camera according to claim 35, wherein said light receiving system includes a light receiving element and a light receiving lens.

* * * * *